(12) United States Patent
Zitting

(10) Patent No.: US 11,280,332 B2
(45) Date of Patent: Mar. 22, 2022

(54) VALVE AND SEAT WITH SEAL

(71) Applicant: Daniel K. Zitting, St. George, UT (US)

(72) Inventor: Daniel K. Zitting, St. George, UT (US)

( * ) Notice: Subject to any disclaimer, the term of this patent is extended or adjusted under 35 U.S.C. 154(b) by 0 days.

(21) Appl. No.: 17/052,640

(22) PCT Filed: May 3, 2019

(86) PCT No.: PCT/US2019/030744
§ 371 (c)(1),
(2) Date: Nov. 3, 2020

(87) PCT Pub. No.: WO2019/213622
PCT Pub. Date: Nov. 7, 2019

(65) Prior Publication Data
US 2021/0239111 A1 Aug. 5, 2021

Related U.S. Application Data

(60) Provisional application No. 62/666,144, filed on May 3, 2018.

(51) Int. Cl.
| | |
|---|---|
| *F16K 1/38* | (2006.01) |
| *F04B 53/10* | (2006.01) |
| *F16K 1/42* | (2006.01) |
| *F16K 1/46* | (2006.01) |
| *F16K 15/06* | (2006.01) |
| *F16K 25/00* | (2006.01) |

(52) U.S. Cl.
CPC ............ *F04B 53/1025* (2013.01); *F16K 1/38* (2013.01); *F16K 1/42* (2013.01); *F16K 1/46* (2013.01); *F16K 15/06* (2013.01); *F16K 25/00* (2013.01); *Y10T 137/7848* (2015.04)

(58) Field of Classification Search
CPC ......... F04B 53/1025; F16K 15/06–063; F16K 1/38; Y10T 137/7848
See application file for complete search history.

(56) References Cited

U.S. PATENT DOCUMENTS

| | | | | |
|---|---|---|---|---|
| 2,571,497 | A | * | 10/1951 | Stewart ................... F16K 15/06 137/512.5 |
| 3,444,889 | A | * | 5/1969 | Graham .............. F04B 53/1087 137/547 |
| 3,483,885 | A | | 12/1969 | Leathers |
| 4,364,411 | A | * | 12/1982 | Payton .................. F16K 15/026 137/513.5 |
| 4,487,222 | A | | 12/1984 | Crawford |
| 4,951,707 | A | | 8/1990 | Johnson |
| 5,052,435 | A | | 10/1991 | Crudup |
| 6,955,181 | B1 | | 10/2005 | Blume |
| 8,276,614 | B2 | * | 10/2012 | Park ........................ F04B 53/10 137/540 |

(Continued)

*Primary Examiner* — Kevin F Murphy
(74) *Attorney, Agent, or Firm* — Gurr Brande & Spendlove, PLLC; Robert A. Gurr

(57) ABSTRACT

A valve and seat set has a seal coupled to the valve body, the seal surface comprising irregularities to allow pressure to propagate in-between the mating surfaces when pressure from the inside of the valve is equal to, or greater than, pressure from the outside of the valve. This allows the seal to lift in response to minimal differential pressure in the intended flow direction (from inside the valve), while effectively sealing pressure in the reverse direction (from outside the valve).

9 Claims, 18 Drawing Sheets

(56) References Cited

U.S. PATENT DOCUMENTS

| | | |
|---|---|---|
| 9,631,739 B2 | 4/2017 | Belshan et al. |
| 2009/0314979 A1 | 12/2009 | McIntire |
| 2013/0020521 A1 | 1/2013 | Byrne |
| 2015/0144826 A1 | 5/2015 | Bayyouk et al. |
| 2017/0002947 A1 | 1/2017 | Bayyouk et al. |
| 2017/0342976 A1 | 11/2017 | Nagaraja Reddy et al. |
| 2018/0073653 A1 | 3/2018 | Bayyouk et al. |

\* cited by examiner

VALVE AND SEAT WITH SEAL

CROSS-REFERENCE TO RELATED APPLICATIONS

This application is a § 371 National Stage Entry of International Application No. PCT/US19/30744 filed May 3, 2019 entitled "Valve and Seat with Seal," which application claims the benefit of U.S. Provisional Application Ser. No. 62/666,144, filed on May 3, 2018, which is incorporated herein by reference.

BACKGROUND

Valve and seat sets, with integrated seals, are used in many reciprocating plunger pumps. In the oil and gas industry, large reciprocating pumps are used in well drilling and completions to pump drilling mud, cement, and well stimulation fluids. For operations in hydraulic fracturing, pumps in excess of 3000 HP pump pressures to 20,000 psi (137.9 MPa) in order to create fractures in rock.

The integrated seals on valve and seat sets are typically an elastomer of rubber or polyurethane and can be subject to damage and premature failure due to these high pressures, aggressive fluids, and abrasive media pumped in the drilling and completion of wells. Improper function of these seals can cause rapid changes in pressure within the pump and pressure piping, leading to fatigue damage of pump components, piping, and valves. Failure of the valve and seat integrated seal can lead to unintended flow of fluids laden with abrasive media, which can quickly erode metal parts of the pump, requiring costly replacement.

One example of prior art is U.S. Pat. No. 9,435,454. A typical pump moves fluid by a reciprocating plunger drawing fluid in through the suction valve and seat set and forcing it out under pressure through the discharge valve and seat set. The valve and seat sets each have a replaceable seat and valve. In application, the valve seals have been known to show damage in some cases after fewer than 50 hours of service, requiring frequent replacement at the well site.

The seal of the valve typically protrudes beyond the valve's metal mating surface. Sufficient pressure on the valve deforms the seal material until the metal surfaces come into contact with the valve seat. The interference of this protruding seal material and the compressive deformation serves to create adequate sealing force with the seat, as well as decelerate the valve during closing, thereby reducing damage to the mating metal surfaces.

The seal is deformed when the pressure applied to the valve outside closes the valve. As the pump operates, pressure applied to the inside of the valve in excess of the pressure outside the valve causes the valve to open. Referring to FIG. 9A, which shows a prior art valve 900, due to the contact of the body mating portion 902 and seal 904 with the seat 906 across a wide surface area, the effective pressurized area on the outside 950 of the valve 900 can be greater than the effective pressurized area on the inside 952 of the valve 900, requiring higher pressure inside than outside (differential pressure) to reopen the valve. In other words, the outer diameter 908 of the valve 900 is larger in diameter and surface area than inner diameter 910. As a result, increased pressure must be applied to the smaller, inner diameter 910 surface area in order to overcome the force of pressure on the larger, outer surface area having the larger diameter 908.

As shown in prior art FIGS. 9A-9B, if the metal-to-metal mating portion 912 (i.e., valve body and seat) creates a tight seal, the inside pressure-affected area would be the inner valve body diameter (FIG. 9A). However, machining marks or angular misalignment may allow pressure to propagate very quickly into the metal-to-metal mating portion 912, but the seal interference and relatively compliant material will not allow pressure to propagate between the mating surfaces 914 of the seal 904 and the seat 906. Thus, referring to FIG. 9B, the pressure-affected area would be the inner diameter 916 calculated at the seal and body junction, which is slightly greater than if the pressure-affected area is limited to the diameter of the inner valve body diameter (as was discussed in relation to FIG. 9A). In either case, significant pressure differential is required to open the valve.

This differential pressure causes shock loads on pump components due to pressure spikes as the valves resist opening, which are increased by the differential pressure required to open the valves. The valves and seals can be damaged by these pressure spikes, creating bursts of high velocity flow as the valve opens with differential pressure. Pressure waves caused by valves opening under differential pressure can send shock loads into piping, unions, and valves downstream of the pump. Fatigue of these components results in costly repairs, replacements, and the need for excess pumping capacity on the well site to compensate for potential equipment failures. Mitigating these failures and frequent replacement of valves due to seal failures results in high maintenance costs and additional staff working at the well site.

While this phenomenon affects both suction and discharge valves, the net differential pressure of the discharge valve is higher due to the high pressure outside the discharge valve when the valve is opened by pressure created by the advancing pump plunger. However, the differential pressure required to open the suction valve can cause cavitation in the pump housing while the pump plunger is retracting.

Therefore, a need exists for a valve and seat set which can operate with minimal differential pressure, and a seal which can lift in response to minimal differential pressure in the intended flow direction (from inside the valve), while effectively sealing pressure in the reverse direction (from outside the valve). The present invention seeks to solve these and other problems.

SUMMARY OF EXAMPLE EMBODIMENTS

In one embodiment, a one-way valve comprises a valve and seat set with a seal coupled to the valve body, the seal surface comprising irregularities to allow pressure to propagate in-between the mating surfaces when pressure from the inside of the valve is equal to, or greater than, pressure from the outside of the valve.

In one embodiment, the seal surface comprises an irregular portion and a regular (e.g., smooth) portion.

In one embodiment, only the seal contacts the valve seat, the seal comprising irregularities.

In one embodiment, a one-way valve comprises a valve and seat set with a seal coupled to the valve body, the valve body surface comprising irregularities to allow pressure to propagate in-between the mating surfaces when pressure from the inside of the valve is equal to, or greater than, pressure from the outside of the valve. In one embodiment, both the valve body and the seal surface comprise irregularities.

In one embodiment, at least a portion of the valve, seat, or seal mating surfaces, or a combination thereof, comprise surface irregularities.

DETAILED DESCRIPTION OF EXAMPLE EMBODIMENTS

Figure 1A:
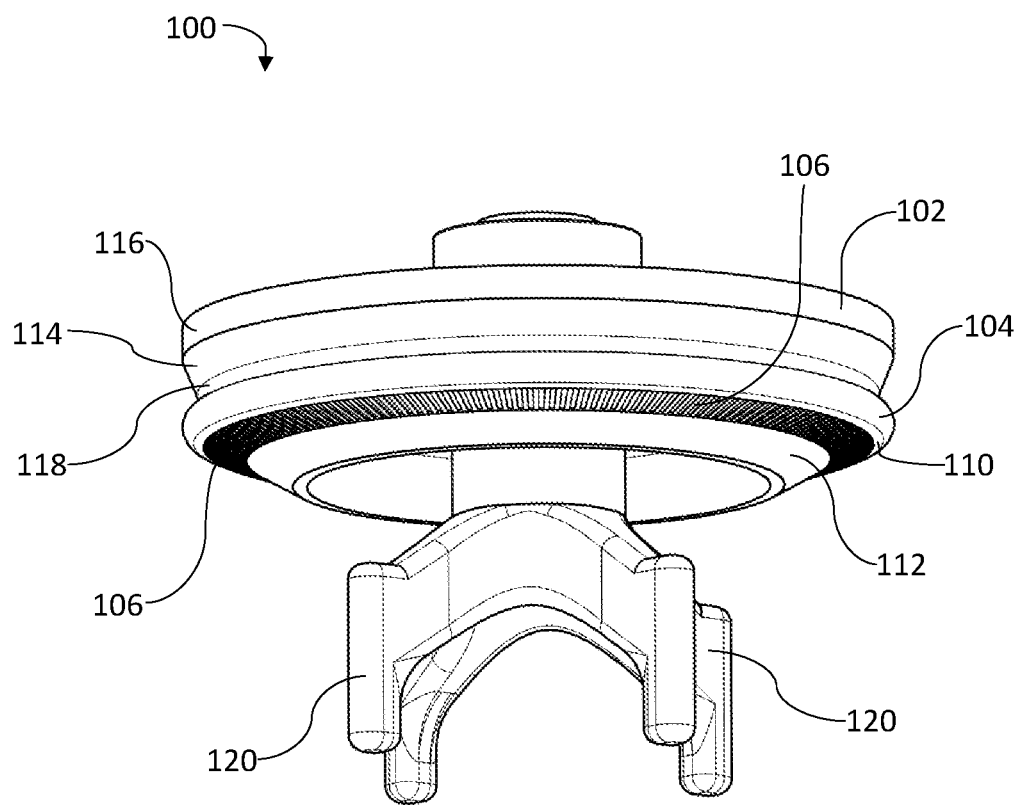
FIG. 1A is a perspective view of a valve body and seal with ribs or grooves on the seal surface.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, a need exists for a one-way valve having a valve and seat set which can operate with minimal differential pressure, and a seal which can lift in response to minimal differential pressure in the intended flow direction (from inside the valve), while effectively sealing pressure in the reverse direction (from outside the valve). The valve and seat with seal disclosed herein solves these and other problems. The one-way valve having a valve and seat with seal disclosed herein overcomes problems in the art by: 1) reducing the pressure spikes inside the system by reducing the differential pressure required to open the valve, thereby reducing peak stresses of the pump assembly; 2) reducing the pressure waves and shock loads sent downstream by the release of differential pressure when the discharge valve opens; 3) reducing cavitation within the pump due to lessened differential pressure required to open the suction valve; 4) allowing pressure from inside the valve to rapidly pressurize more of the interface between the valve and seal with the mating surfaces of the seat, thereby reducing the differential pressure and time required to open the valve; and 5) providing a seal design which effectively seals when differential pressure is applied from the outside to close the valve, but allows pressure to migrate under the seal when pressure reaches equilibrium, or minimal differential pressure from inside, to open the valve.

In one embodiment, the seal surface comprises irregularities to at least a portion of either the valve, seat, or seal mating surfaces, or a combination thereof, to allow pressure to propagate in-between the mating surfaces when pressure from the inside of the valve is equal to, or greater than, pressure from the outside of the valve. These surface irregularities can take on a myriad of forms, examples of which are shown herein as embodiments.

Surface irregularities in the valve or seat mating metal surfaces may require additional steps in manufacturing. Surface irregularities in the seal could be formed after molding but could alternatively be features in the mold for ease of manufacturing. For these reasons, the embodiments with surface irregularities on the seal surface may be preferred over irregularities in the seat or valve mating surfaces.

Figure 1B:
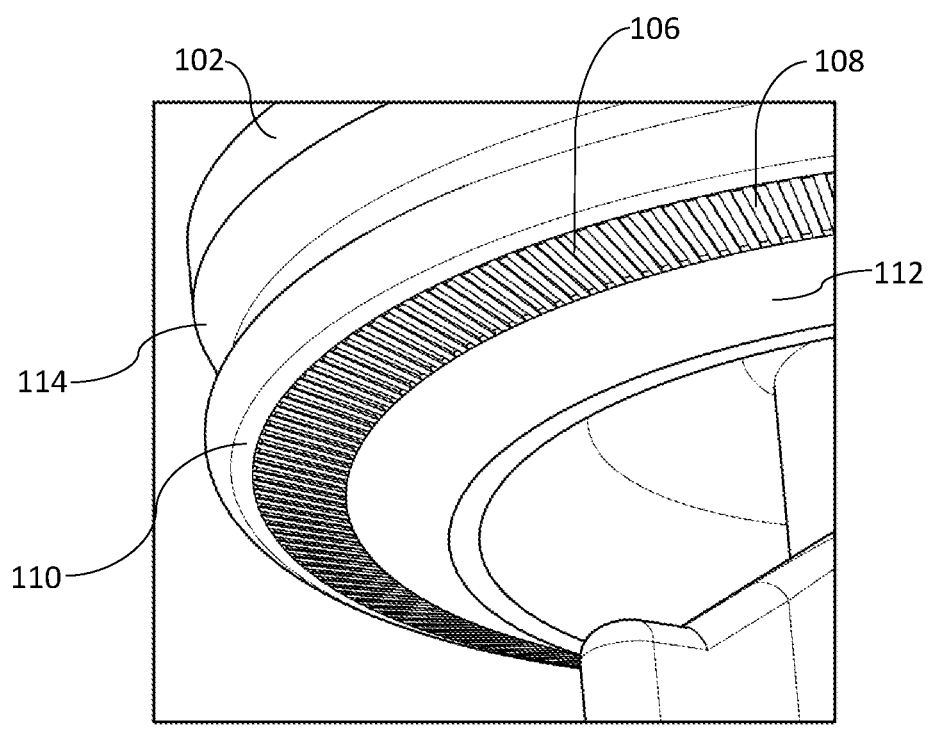
FIG. 1B is an enlarged, detailed view of FIG. 1A illustrating the ribs or grooves on the seal surface.
Figure 1C:
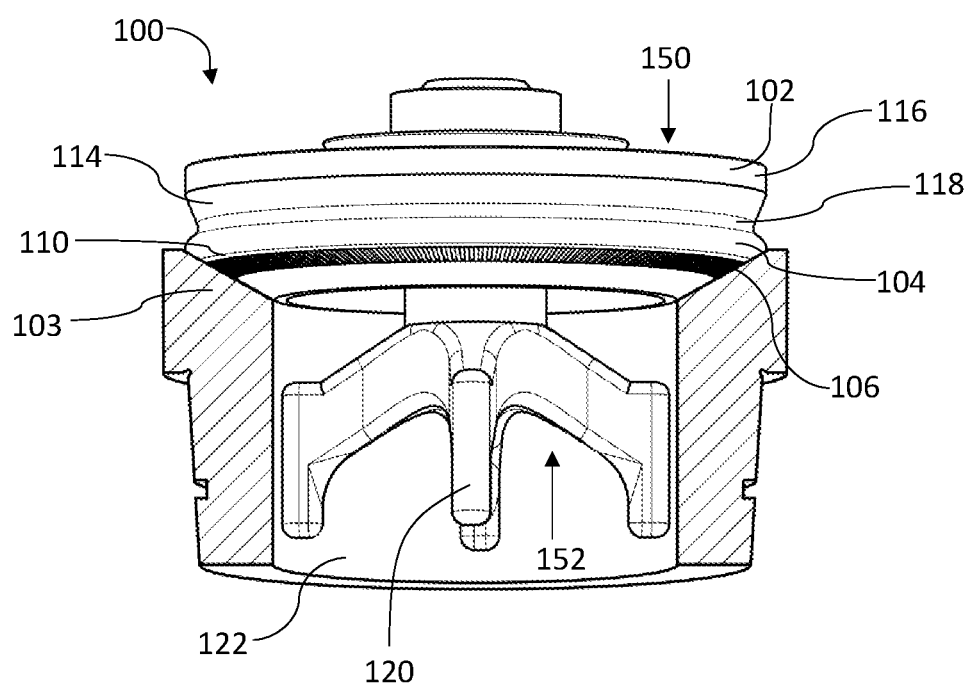
FIG. 1C illustrates a partial cross-section of a closed valve with the seal surface comprising irregularities.

In one embodiment, as shown in FIGS. 1A-1C, a one-way valve 100 comprises a valve body 102 (e.g., metal) and a seal 104 (e.g., typical soft sealing material), the seal 104 comprising ribs 106 as surface irregularities, the ribs 106 separated by grooves 108. The ribs 106 and grooves 108 are on the portion of the seal 104 that mates with a valve seat 103. These ribs 106 and grooves 108 can be effective in many different quantities, shapes, sizes and spacing variations. Further, the ribs 106 may protrude from the surface or may be formed by grooves 108 in the surface. In one embodiment, the seal 104 may further comprise a second portion 110 that is regular and uninterrupted (i.e., smooth) that mates with the valve seat 103 to effect a positive seal when pressure from the outside 150 of the valve 100 exceeds pressure from inside 152 the valve 100 (see FIG. 1C). Further, the valve 100 comprises body mating portion 112 (metal) that likewise mates with the valve seat 103. In other words, both the seal 104 and the body mating portion 112 mate with the valve seat 103. The grooves 108 allow the inside pressure to communicate to a portion of the mating area between the valve seat 103 and the seal 104, thereby reducing the difference between the area affected by pressure inside the valve 100 and the area affected by pressure outside the valve 100. Hence less differential pressure is required to open the valve 100.

Figure 8A:
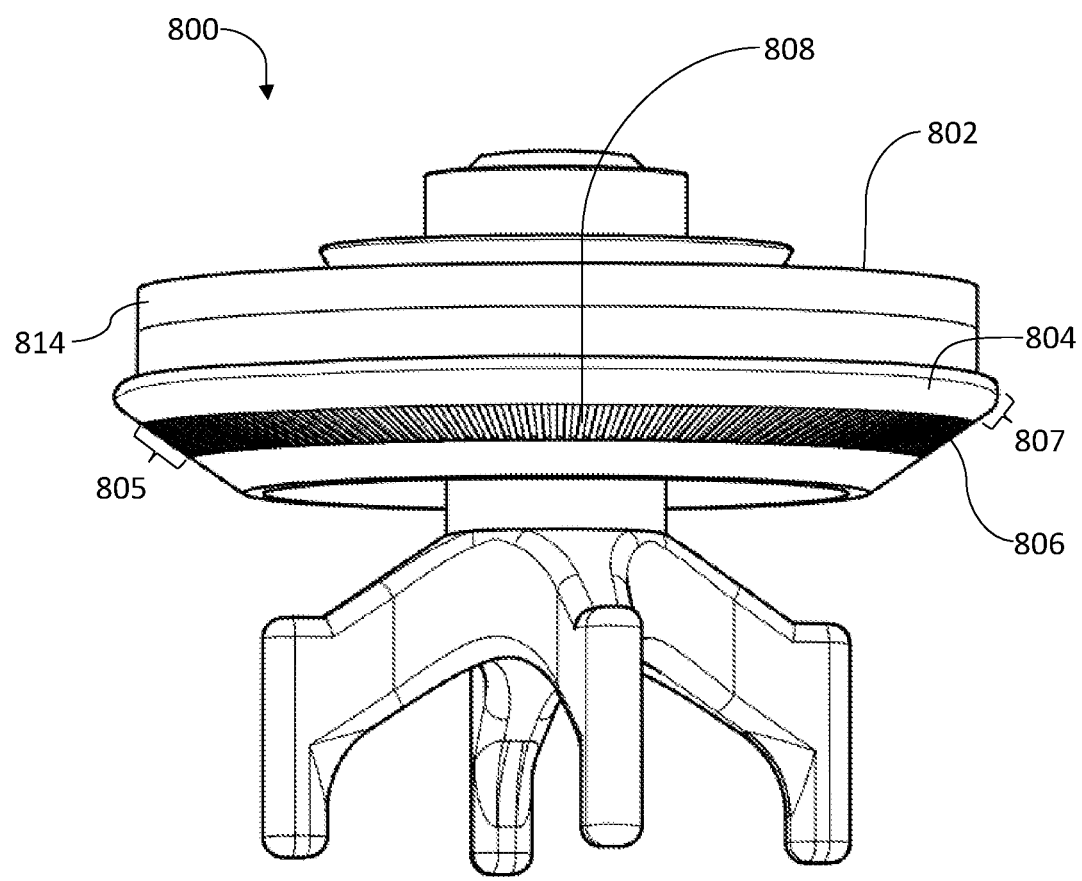
FIG. 8A is a perspective view of a valve body and seal, the seal comprising an irregular portion and regular portion.
Figure 9A:
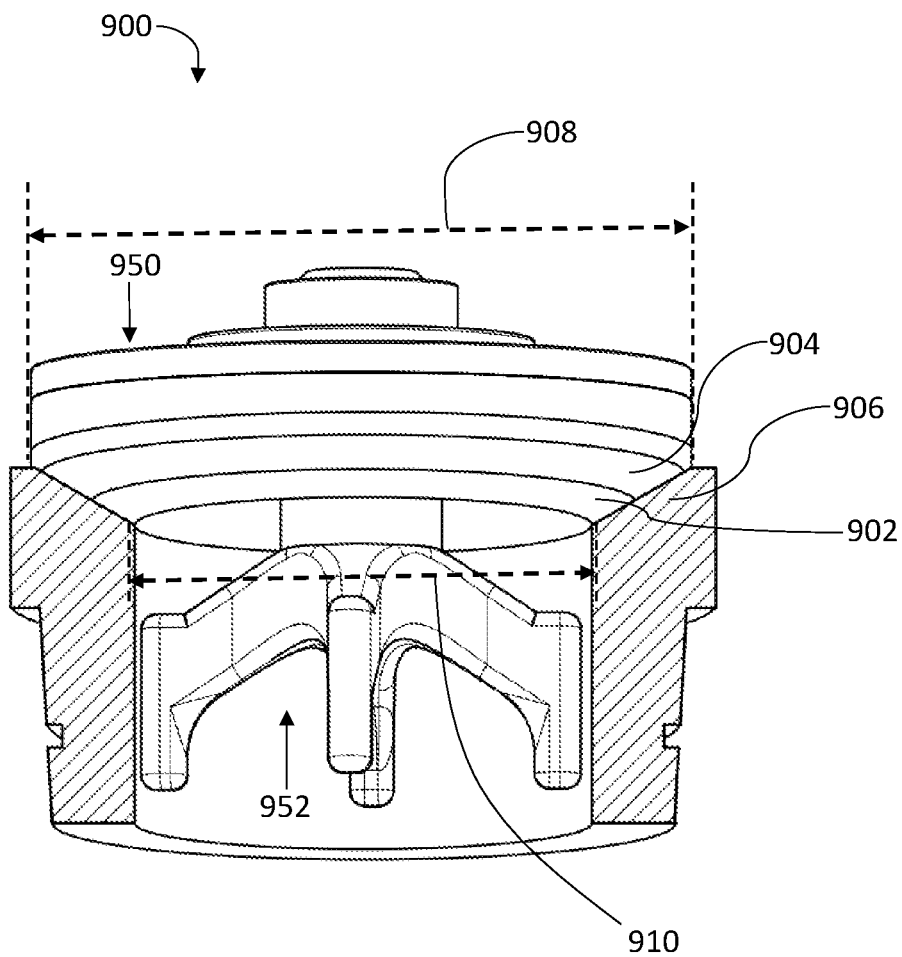
FIG. 9A is a partial cross-section of a closed valve of the prior art.
Figure 9B:
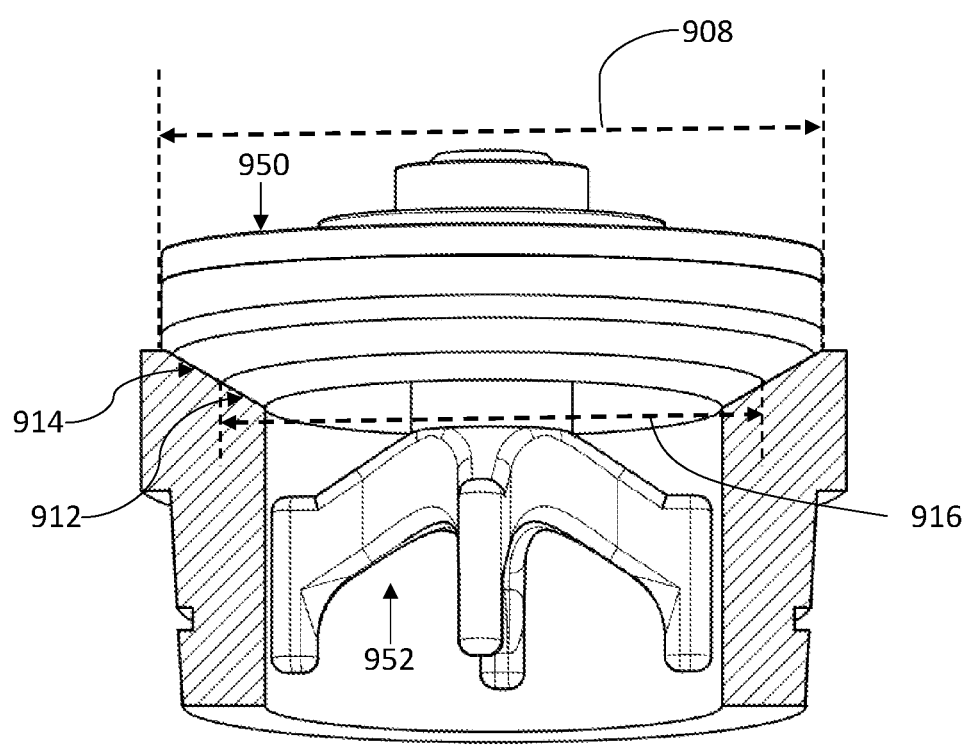
FIG. 9B is a partial cross-section of a closed valve of the prior art.

Further, in one embodiment, the valve body 102 comprises a tapered sidewall 114. In other words, the valve body 102 comprises a top, first edge 116 having a first diameter, and a middle, second edge 118 having a second, lesser diameter, the tapered sidewall 114 interposed between the top edge 116 and middle edge 118. The middle edge 118 and tapered sidewall 114 allow for the seal 104 to flex upwardly, allowing the seal 104 to flex and lift off the valve seat 103 in response to pressure inside the valve exceeding pressure outside the valve, thereby assuring the entire mating surface of the seal 104 is pressurized and further reducing the differential pressure required to open the valve 100. Although a tapered sidewall 114 is used as an example, it will be appreciated that a tapered sidewall 114 is not required. For example, FIG. 8A illustrates a sidewall 814 that is not tapered. Further, in one embodiment, the second portion (uninterrupted) 110 has a diameter greater than that of middle edge 118. Accordingly, the second portion 110 may have a diameter that is greater than at least a portion of the sidewall (e.g., middle edge 118), allowing the second portion to flex upwardly more easily. However, the ability of the seal and/or second portion to flex upwardly is not required, and the formfactor of current valve bodies and seals in the art may be used. The valve sidewall with a diameter less than that of the seal is not required. For example, the valve sidewalls as shown in FIGS. 9A-9B, that are consistent in diameter with the seal, would also function, even though the seal cannot flex upwardly, and do not depart from the present invention.

Further, the valve 100 may comprise one or more means for guiding the valve 100 to properly mate with the valve seat 103. For example, the valve 100 may comprise one or more valve body guides 120. The valve body guides 120 ensure that the seal 104 and body mating portion 112 remain concentric and mate evenly with the valve seat 103, creating a seal. It will be appreciated that the valve body guides 120 may take a variety of formfactors, including, but not limited to, protrusions such as legs, spheres, cylinders, or other suitable guiding means. As shown, the guiding protrusions 120 engage the valve seat sidewall 122, ensuring correct orientation.

Figure 2:
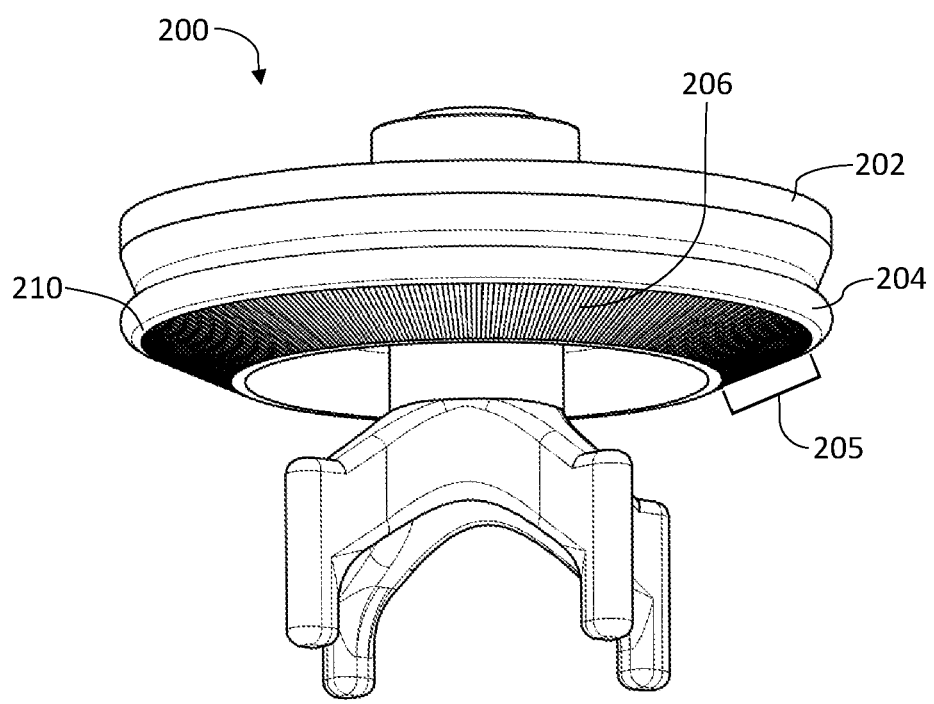
FIG. 2 is a perspective view of a valve body and seal, the seal forming the entire contact portion with the seat, the seal having ribs or grooves.

In one embodiment, as shown in FIG. 2, the valve 200 comprises a valve body 202 and a seal 204, the seal 204 comprising surface irregularities (e.g., ribs 206). As illustrated, only the seal 204 mates with the valve seat. In other words, the first portion 205 (i.e., seal mating surface) extends the entire length of the valve seat, eliminating metal-to-metal contact that would occur if the valve body 202 also mated with the valve seat. In one embodiment, the seal 204 may further comprise a regular, uninterrupted portion 210 (e.g., smooth surface). This ensures a liquid-tight seal when seal 204 is mated with a seat.

Figure 3:
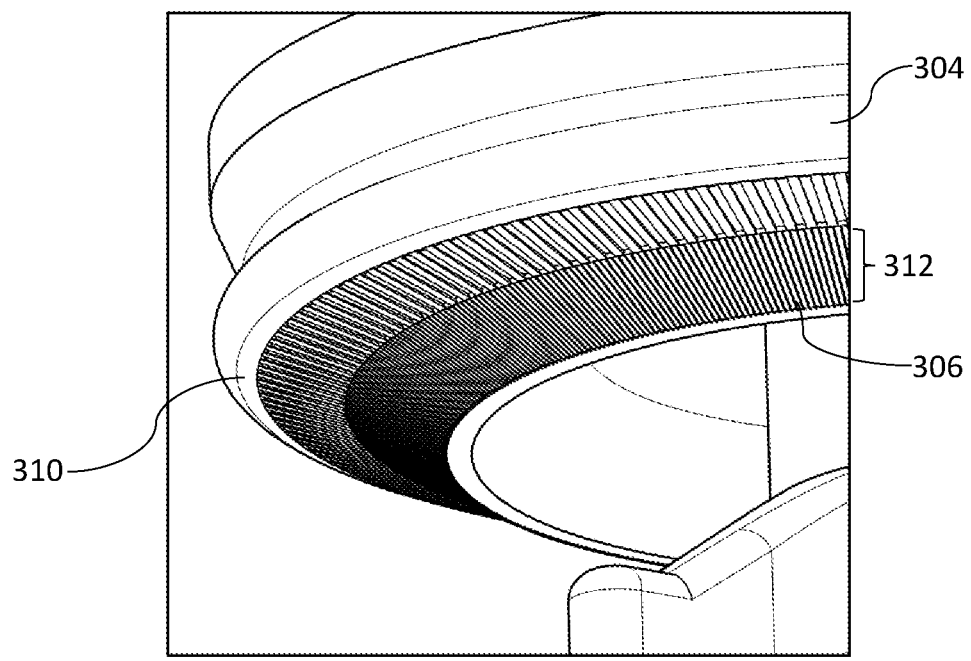
FIG. 3 is a detailed, perspective view wherein the valve body contacting surface comprises ribs or grooves as does the seal surface.

Referring to FIG. 3, in one embodiment, the body mating portion 312 comprises surface irregularities, such as ribs 306. However, ribs 306 are not required and other irregularities may be used. Further, the surface irregularities can be a pattern (for example, broached, lathe cut, or laser etched irregularities) or a random roughness (for example, a forged surface or grit blasted surface). With surface irregularities in both the body mating portion 312 and seal 304, the inside pressure is able to propagate much faster radially outwardly, reducing the pressure differential and allowing the valve to open with significantly less pressure than the prior art. In one embodiment, in order to ensure a liquid-tight seal under pressure, the seal 304 may further comprise regular, uninterrupted portion 310.

Figure 4A:
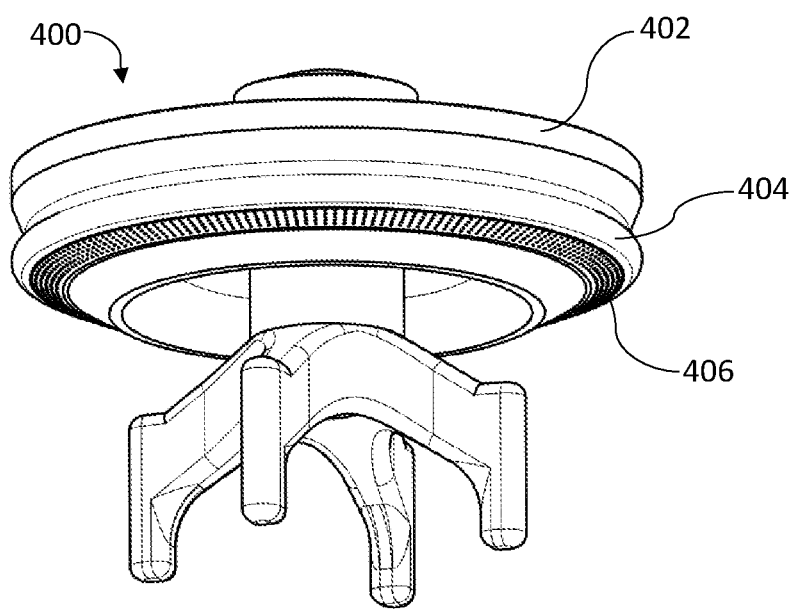
FIG. 4A is a perspective view of a valve body and seal with protrusions on the seal surface.
Figure 4B:
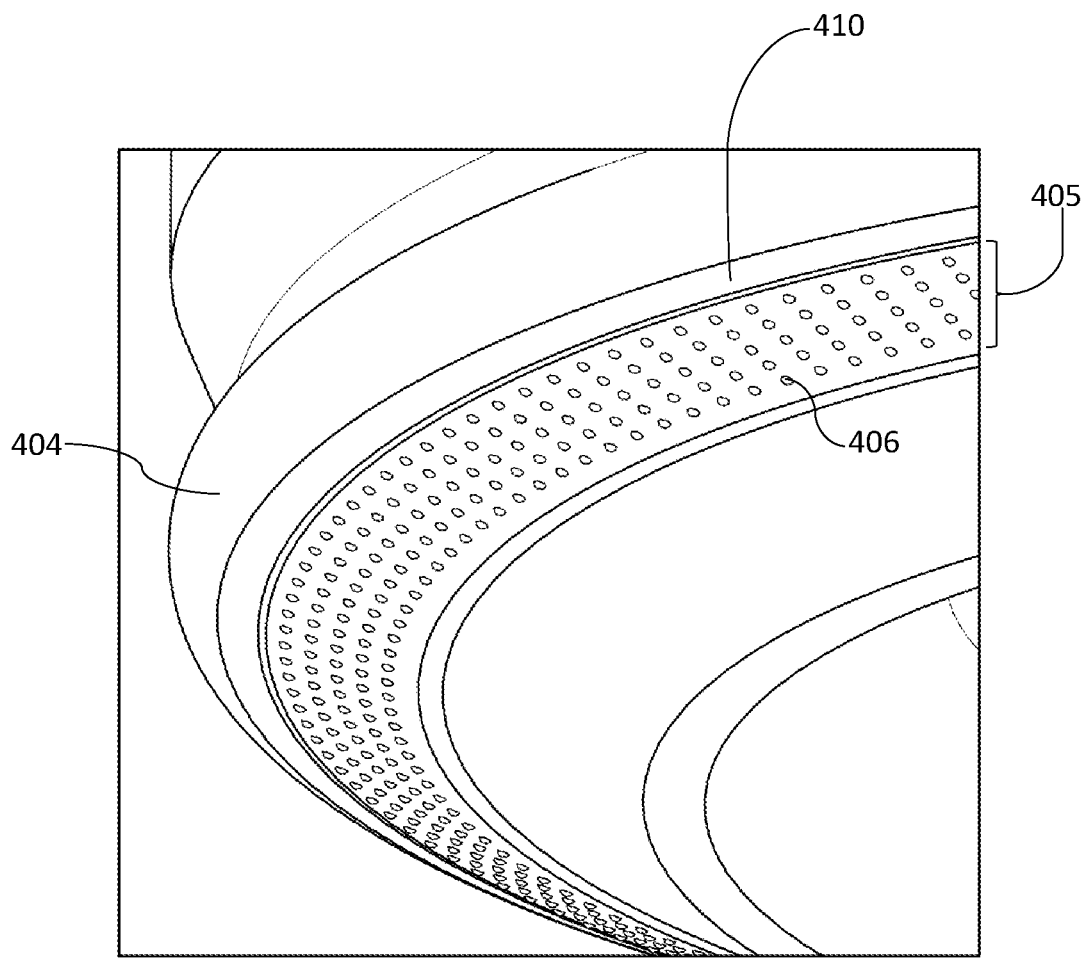
FIG. 4B is an enlarged, detailed view of FIG. 4A illustrating the protrusions on the seal surface.

In one embodiment, as shown in FIGS. 4A-4B, a valve 400 comprises a valve body 402 and a seal 404, the seal 404 having a first portion 405 comprising protrusions 406 as surface irregularities. The first portion 405 and protrusions 406 thereon mate with a valve seat. These protrusions 406 can be effective in many different quantities, shapes, sizes and spacing variations. In one embodiment, the seal 404 may further comprise a second portion 410 that is regular and uninterrupted (i.e., smooth) and that mates with the valve seat to effect a positive seal when pressure from the outside of the valve 400 exceeds pressure from inside the valve 400. The protrusions 406 allow presurization of the first portion 405 (i.e., seal mating surface) when pressure inside the valve 400 is equal to or greater than the pressure outside the valve 400.

Figure 5A:
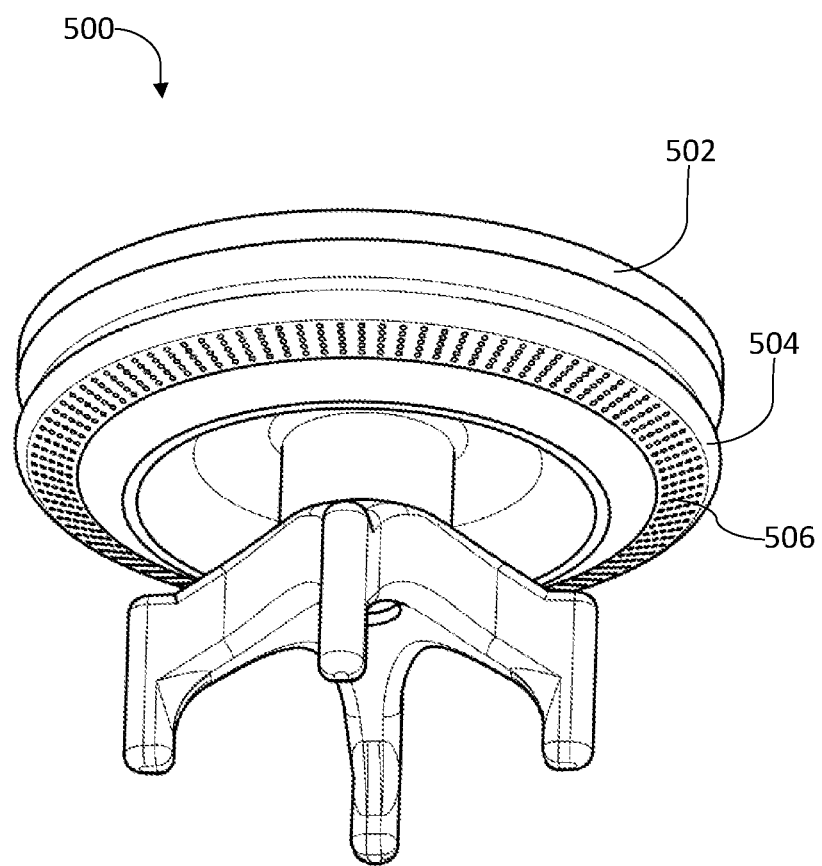
FIG. 5A is a perspective view of a valve body and seal with voids (depressions) on the seal surface.
Figure 5B:
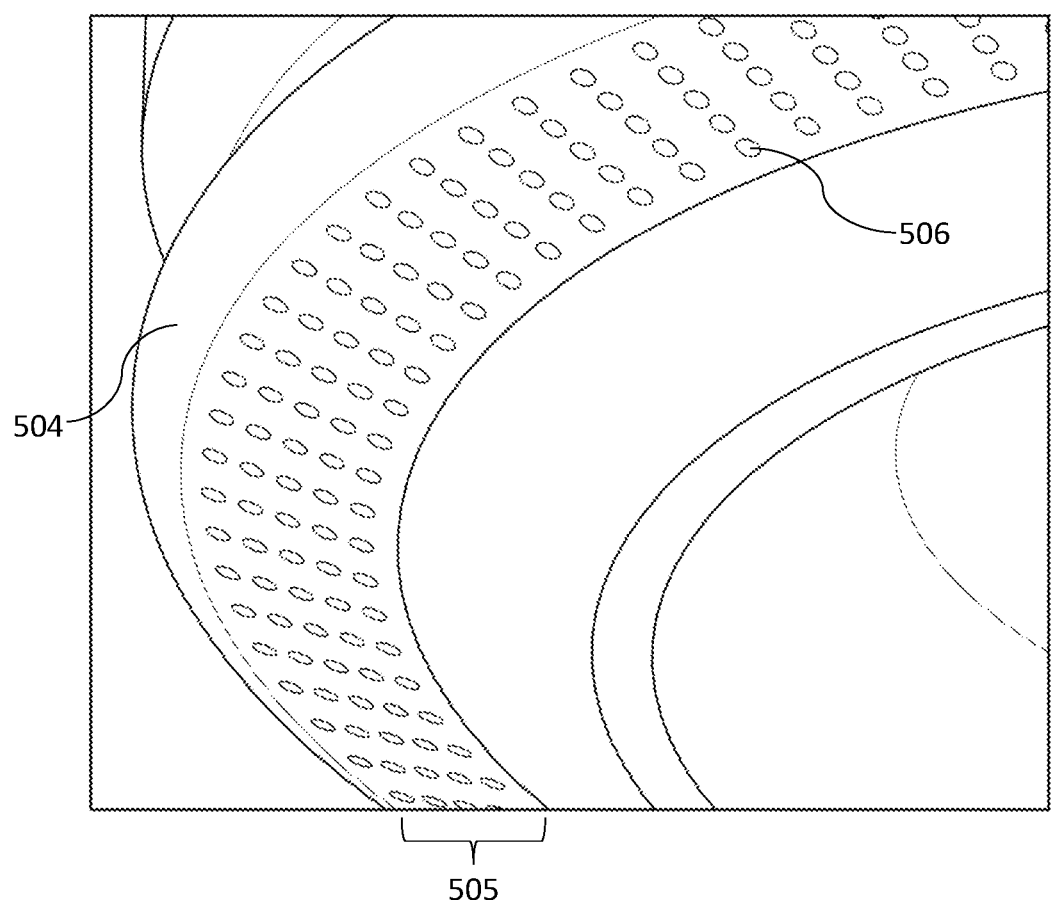
FIG. 5B is an enlarged, detailed view of FIG. 5A illustrating the voids on the seal surface.

In one embodiment, as shown in FIGS. 5A-5B, a valve 500 comprises a valve body 502 and a seal 504, the seal 504 comprising voids (i.e., depressions) 506 as surface irregularities. The voids 506 are on the portion of the seal 504 that mates with a valve seat. These voids 506 can be effective in many different quantities, shapes, sizes and spacing variations. The voids 506 allow presurization of the seal mating surface 505 when pressure inside the valve 500 is equal to or greater than the pressure outside the valve 500. This pressurization allows the valve 500 to open under less pressure than valves in the art. The voids 506 may also trap fluid therein. Then, when pressure inside the valve 500 causes the seal 504 between the voids 506 to deform, the voids 506 are squeezed and the trapped fluid would be pressurized and assist in lifting the seal 504 off of the valve seat.

Figure 6A:
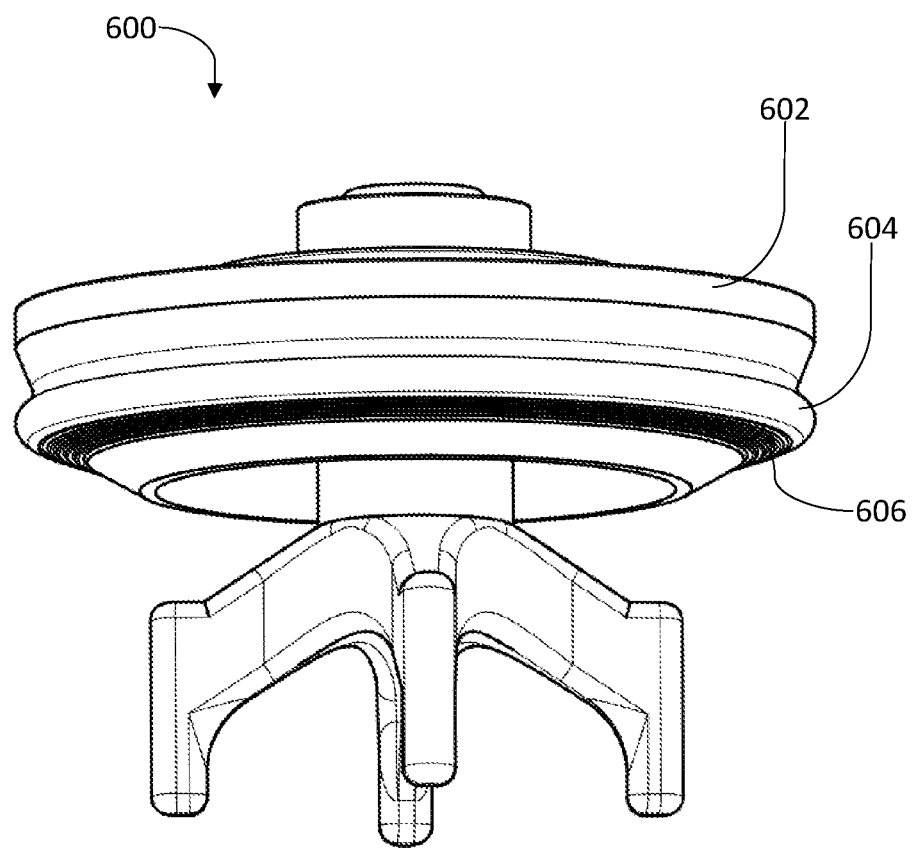
FIG. 6A is a perspective view of a valve body and seal with annular rings on the seal surface.
Figure 6B:
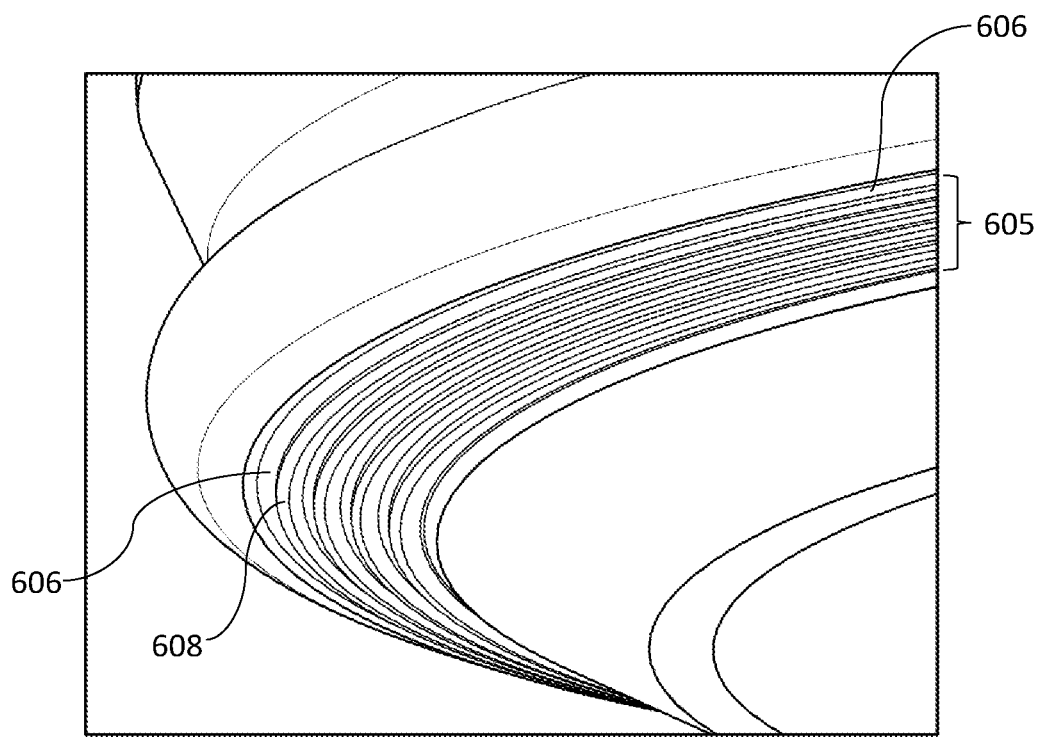
FIG. 6B is an enlarged, detailed view of FIG. 6A illustrating the annular rings on the seal surface.

In one embodiment, as shown in FIGS. 6A-6B, a valve 600 comprises a valve body 602 and a seal 604, the seal 604 comprising annular rings 606 as surface irregularities. The annular rings 606 are on the portion of the seal 604 that mates with a valve seat. These annular rings 606 can be effective in many different quantities, shapes, sizes and spacing variations. The annular rings 606 allow presurization of the seal mating surface 605 when pressure inside the valve 600 is equal to or greater than the pressure outside the valve 600. This pressurization allows the valve 600 to open under less pressure than valves in the art. Grooves 608 between the rings 606 may trap fluid. Then, when pressure inside the valve 600 causes the seal 604 to deform, the trapped fluid would be pressurized and assist in lifting the seal 604 off of the valve seat. Furthermore, the rings 606 may have differering inside and outside angles to effect one-way sealing.

Figure 7A:
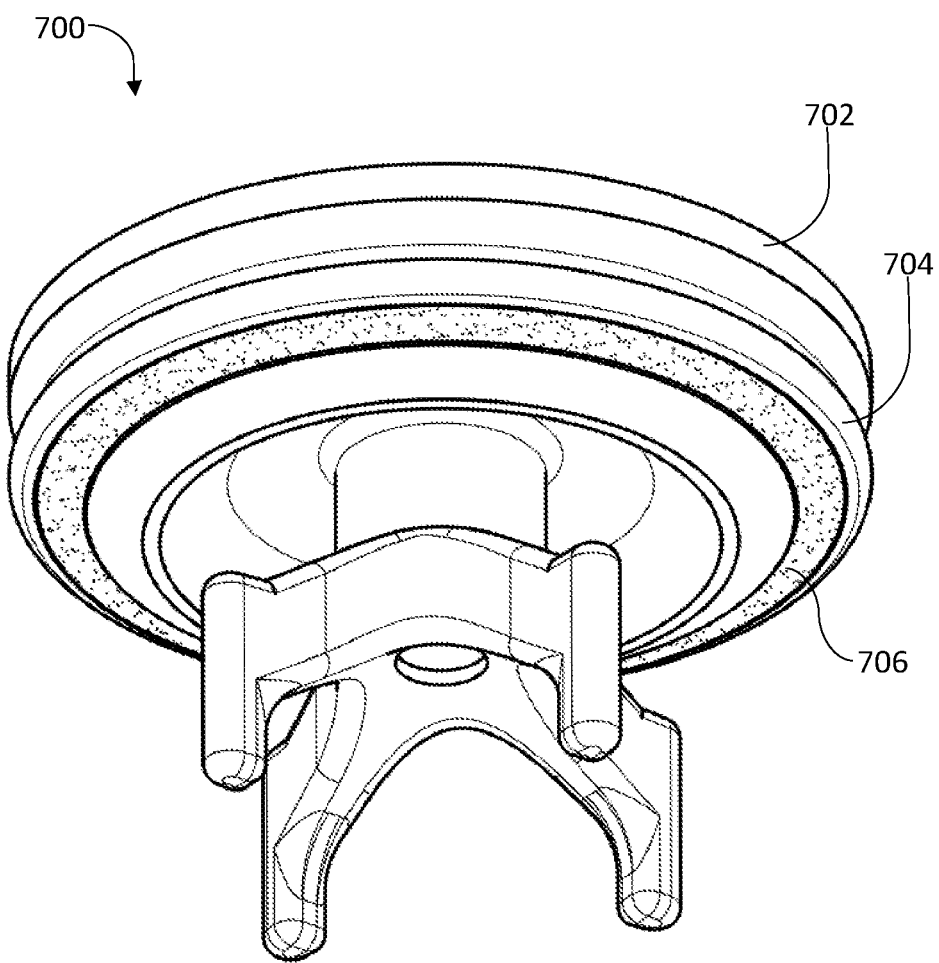
FIG. 7A is a perspective view of a valve body and seal with texturing on the seal surface.
Figure 7B:
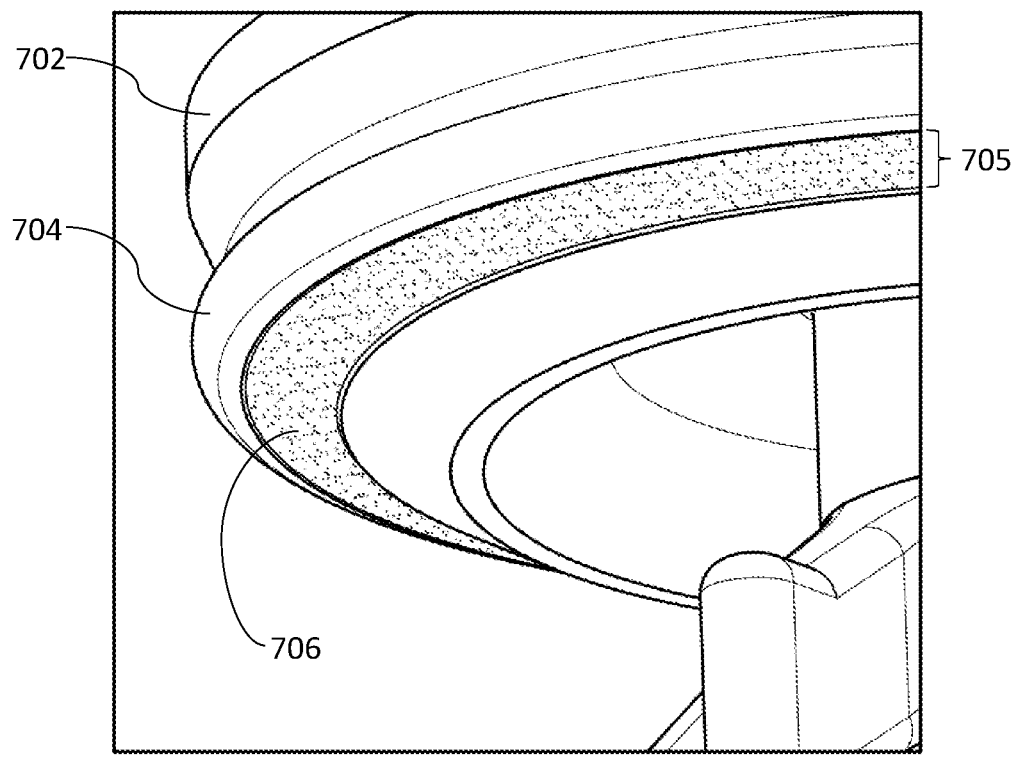
FIG. 7B is an enlarged, detailed view of FIG. 7A illustrating the texturing on the seal surface.

In one embodiment, as shown in FIGS. 7A-7B, a valve 700 comprises a valve body 702 and a seal 704, the seal 704 comprising textured surface 706 as the surface irregularity. The textured surface 706 is on the portion of the seal 704 that mates with a valve seat. The textured surface 706 may be effective in wide variety of repeating texture features (for example, a knurled surface in the mold) or random texture (for example, eroded surfaces in the mold or on the seal 704 after molding). The textured surface allows presurization of the seal mating surface 705 when pressure inside the valve 700 is equal to or greater than the pressure outside the valve 700. This pressurization allows the valve 700 to open under less pressure than valves in the art.

It should be recognized by one of ordinary skill in the art of fluid sealing that seal mating surface irregularities of all shapes or textures could be flattened out completely by sufficient differential pressure on the outside of the valve, depending on the size and spacing or roughness of irregularities, the hardness of the seal material, the interference of the seal mating surfaces, and many other factors. Therefore, with proper design and material choice, the surface irregularities could extend across the entire mating portion of the seal (e.g., FIGS. 5A-5B) and still be an effective seal with sufficient pressure from the outside, yet allowing pressure to propagate through the seal mating surface when pressure inside the valve is equal to, or greater than, the pressure outside the valve. Thus, with proper design and material of the surface irregularities, it may not be necessary to provide uninterrupted (i.e., smooth) portions (e.g., 110, 210, 310, 410) to effect a positive seal.

The surface of all seals will have some roughness, even if unintended, due to imperfections of the material or manufacturing processes of the mold and/or the seal. It is common in the art of static seals to recommend seal and mating surfaces with roughness no more than 64 Ra micro-inches (1.6 micrometers). Therefore, the surface irregularities on the mating surface of the seal, seat, or valve mating surface would preferably provide a roughness of greater than 64 Ra micro-inches (1.6 micrometers) on at least a portion of the seal mating surface, seat mating surface, valve mating surface, or combination thereof. However, it will be appreciated that the invention is not limited to being greater than 64 Ra micro-inches (1.6 micrometers) and could therefore also be equal to, or less than, that size.

It may be recognized by one of ordinary skill in the art of pressure pumping service that erosion and wear of the seal, seat, and valve body mating surfaces will typically wear and/or erode, especially in the presence of abrasive material or proppant in the pumped fluid, to eventually produce surface roughness on the mating surfaces. It may also be recognized that trapped solid material or proppant between the valve, seal, and seat surfaces may help allow propagation of pressure between mating surfaces. However, damage to the valve, seal, pump, downstream equipment, or other components in the system could occur before such roughness occurs by wear to the mating surfaces, or separation is aided by proppant. For example, in hydraulic fracturing it is common to pump significant volume and build high pressure before adding proppant to the fracturing fluid. Therefore, it is preferable to provide the mechanism to facilitate pressure propagation on new, unused valves and seat assemblies.

Figure 8B:
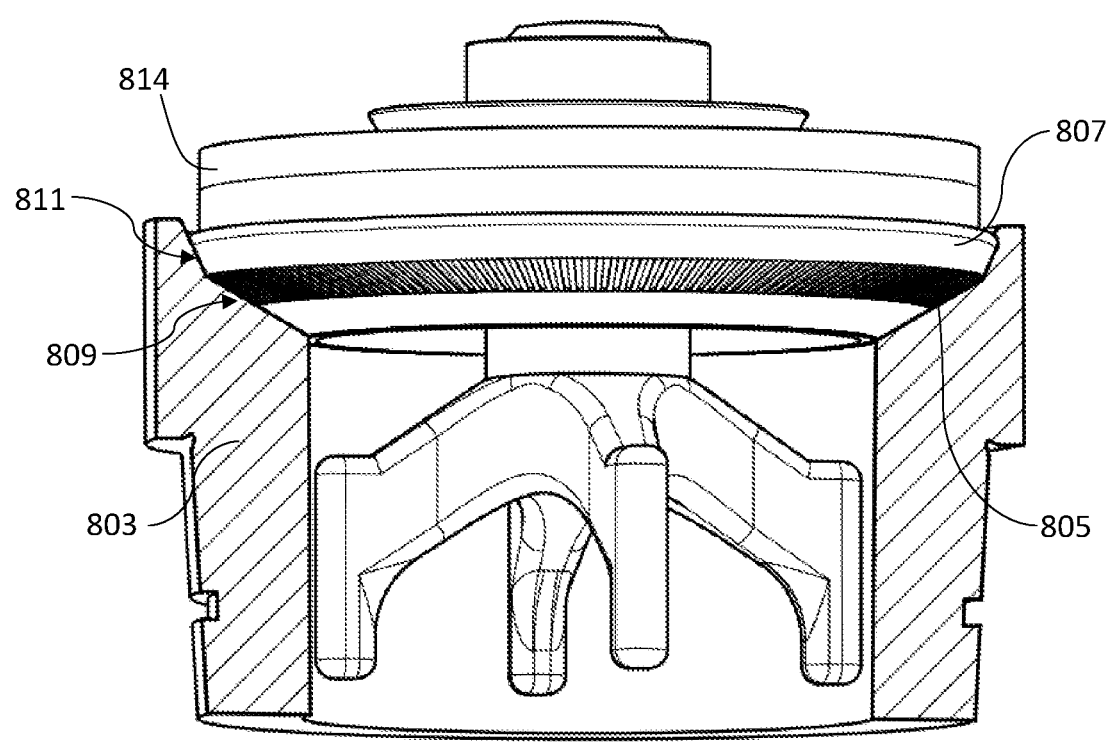
FIG. 8B is a partial cross-section of a closed valve, wherein the irregular portion of the seal and the regular portion of the seal mate with separate surfaces of seat.

Referring to FIGS. 8A-8B, in one embodiment, a valve 800 comprises a valve body 802 and a seal 804, the seal 804 comprising ribs 806 as surface irregularities, the ribs 806 separated by grooves 808. The valve body 802 may comprise a valve body sidewall 814 having a first diameter. The seal 804 has a second diameter that is greater than the first diameter of the valve body sidewall 814. This allows the seal 804 to flex upwardly and inwardly toward the valve body sidewall 814 when subjected to internal pressure. As shown, the seal may comprise two or more surfaces (portions), with a first portion 805 comprising irregularities 806 and a second portion 807 that is regular (i.e., does not comprise irregularities; smooth). As shown in FIG. 8B, the valve seat 803 may comprise first mating surface 809 and second mating surface 811 that are complementary to the first portion 805 and second portion 807. Further, the first portion 805 and second portion 807 are differing angles (i.e., are in different geometric planes). This embodiment has the advantage of minimal pressure differential area vs. area of continuous uninterrupted sealing contact.

Figure 10:
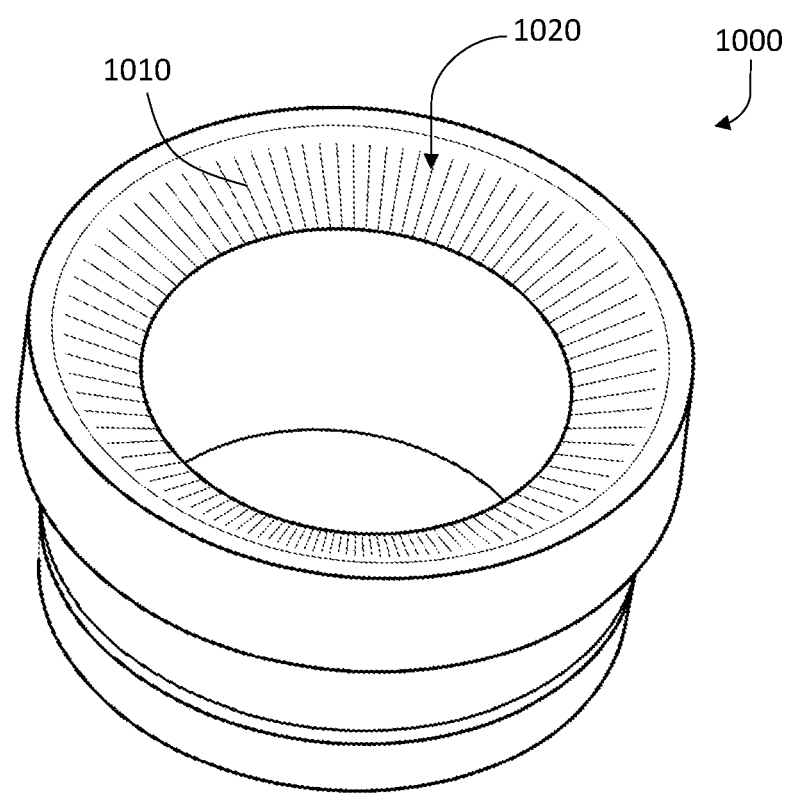
FIG. 10 is a top perspective view of a valve seat having irregularities on the valve seat portion.

Referring to FIG. 10, in one embodiment, valve seat 1000 comprises irregularities 1010 (e.g., grooves) on the seat mating surface 1020. As shown, the irregularities 1010 need not occupy the entire seat mating surface 1020, although they may. In one embodiment, a valve body and seal assembly may be smooth (i.e., contain no irregularities) and the valve seat 1000 alone comprises irregularities 1010. In other embodiments, some combination of the valve seat 1000, valve body, and seal may comprise irregularities, as discussed and shown throughout.

Therefore, it will be appreciated from the foregoing that the valve and seat disclosed herein solve the needs in the industry by allowing the seal to lift in response to minimal differential pressure in the intended flow direction (from inside the valve), while effectively sealing pressure in the reverse direction (from outside the valve).

What is claimed:
1. A one-way valve, comprising:
 a valve body, the valve body comprising a valve body sidewall and a valve body mating portion for mating with a valve seat;
 a seal coupled to the valve body, the seal comprising:
  a first portion having a seal mating surface comprising a plurality of ribs extending radially outward, the ribs configured to contact the valve seat and form recesses between the ribs that allow for radially extending flow paths, providing greater pressurization of the first portion; and
  a second portion comprising a smooth surface for contacting the valve seat;
 and, one or more valve body guides to keep the valve body and seal concentric with the valve seat.
2. The one-way valve of claim 1, wherein the recesses are configured to trap fluid, the trapped fluid allowing the pressure to propagate faster through the first portion.
3. The one-way valve of claim 1, wherein the first portion is at a different angle than the second portion.

4. The one-way valve of claim 3, wherein the valve seat comprises a first mating surface and a second mating surface complementary to the first and second portions, respectively.

5. The one-way valve of claim 1, wherein the valve body mating portion comprises surface irregularities.

6. The one-way valve of claim 1, wherein the second portion has a diameter greater than at least a portion of the valve body sidewall, allowing the second portion to flex upwardly and inwardly toward the valve body sidewall when the one-way valve is subjected to inside pressure.

7. A one-way valve, comprising:
- a valve body comprising a valve body sidewall and a valve body mating portion for mating with a valve seat;
- a seal coupled to the valve body, the seal comprising:
  - a first portion having a seal mating surface comprising irregularities configured to form a radial flow path, the seal mating surface configured to mate with the valve seat, thereby providing greater pressurization of the first portion; and
  - a second portion comprising a smooth surface for mating with the valve seat;
- and, one or more valve body guides to keep the valve body and seal concentric with the valve seat.

8. The one-way valve of claim 7, wherein the irregularities comprise protrusions or recesses that are aligned radially outward.

9. The one-way valve of claim 7, wherein the irregularities comprise protrusions.

* * * * *